United States Patent

[11] 3,570,811

| [72] | Inventor | Julius Kruschik |
| | | Gumpoldskirchen, Austria |
| [21] | Appl. No. | 788,713 |
| [22] | Filed | Jan. 3, 1969 |
| [45] | Patented | Mar. 16, 1971 |
| [73] | Assignee | Istag A.-G. Suhr/AG, Hint. Dorfstrasse, Suhr, Switzerland |
| [32] | Priority | Jan. 5, 1968 |
| [33] | | Germany |
| [31] | | P 16 75 433.9 |

[54] SPHERICAL PLUG VALVE
4 Claims, 7 Drawing Figs.

[52] U.S. Cl. .................................................. 251/174, 251/315
[51] Int. Cl. .................................................. F16k 5/20
[50] Field of Search ...................................... 251/174, 315

[56] References Cited
UNITED STATES PATENTS

| 2,942,840 | 6/1960 | Clade | 251/174 |
| 3,014,690 | 12/1961 | Boteler | 251/174 |
| 3,077,902 | 2/1963 | Vickery | 251/174X |
| 3,233,862 | 2/1966 | Marsh | 251/174X |
| 3,356,337 | 12/1967 | Olen | 251/315 |
| 3,367,359 | 2/1968 | Johnson | 251/315X |
| 3,394,915 | 7/1968 | Gachot | 251/174 |
| 3,401,914 | 9/1968 | Shand | 251/174X |

FOREIGN PATENTS

| 978,601 | 12/1964 | Great Britain | 251/174 |

Primary Examiner—Clarence R. Gordon
Attorney—Waters, Roditi, Schwartz & Nissen

ABSTRACT: A spherical plug valve comprises a three-part casing, the middle part containing the spherical plug and an annular holding disc for sealing rings on either side of the plug. The holding discs are mounted in the planes of separation of the valve casing. Each annular holding disc carries at its inner periphery a sealing ring coacting with the spherical valve plug and at its outer periphery a sealing ring providing the seal between the two adjacent casing parts. The annular holding disc may be formed by two sheet metal discs which are axially flanged at their inner periphery to form two radially spaced axially extending flanges engaging between themselves the sealing ring coacting with the spherical valve plug. A supporting ring mounted in the middle part of the casing between the plug and the holding disc supports the holding disc against pressure when the valve is in closed position and allows a limited deformation of the holding disc.

SPHERICAL PLUG VALVE

The invention relates to a valve having a spherical plug which is rotatably mounted between two sealing rings surrounding the inlet and outlet openings in the valve casing, this casing being separated at least in one plane extending at right angles with respect to the direction of flow through the valve.

The object of the invention is to construct spherical plug valves in such manner that the portion of the casing containing the plug can be radially removed from a pipe conduit after disconnection of screws connecting the said casing portion with adjacent portions.

In known constructions, the sealing rings coacting with the spherical plug are generally mounted in casing parts which do not contain the plug. For this reason, difficulties are obtained with such constructions when it is endeavored to dismantle the valve radially, because the plug or the sealing ring with its mounting means project into the opening of the adjacent casing part.

According to the present invention, an annular holding disc is provided and is mounted in the plane of separation in the part of the casing containing the spherical plug, said annular holding ring carrying at its inner edge the sealing ring coacting with the plug and at its outer edge a sealing ring for effecting the seal between the two adjacent casing portions. In this manner the sealing ring coacting with the plug can be removed from the pipe conduit together with the casing portion containing the plug, the holding disc providing a fixed nondeformable mounting for this sealing ring relatively to the casing.

A favorable construction is obtained when the holding disc is provided with a circumferential groove for the reception of the sealing ring coacting with the adjacent casing parts, and one face of the holding disc, in proximity of its inner edge, is provided with an annular coaxial groove for the reception of the sealing ring coacting with the spherical plug. The sealing ring providing a sealing action against the adjacent casing part must be so formed that when it is placed in proper position it will be tightly applied against the holding disc as well as against both casing parts. This action can be advantageously obtained when a C-ring is used having a diameter greater than the thickness of the holding disc.

A further economical and simple construction is obtained when the holding disc with the two mounting grooves for the sealing rings is formed of sheet metal. The disc may then be substantially plane and carry the sealing rings along the outer and the inner edges, the sealing rings being provided at their inner edge with an outwardly directed annular groove, and at their outer edge with an inwardly directed groove for engagement of the edges of the holding disc.

In valves subject to higher stress, the holding disc may be formed of two sheet metal discs of the same external diameter, the two discs being held together at their outer edges by the sealing ring forming the seal between the two adjacent casing parts, their inner edges being flanged in substantially axial direction to hold between the flanges the sealing ring coacting with the spherical plug. By means of the flanges the sealing ring coacting with the plug is firmly held at the inner and outer sides, so that it cannot give way or yield in radial direction even with high axial pressures acting on the plug. In this manner the sealing capacity of the sealing ring and accordingly its life is considerably increased.

The sealing ring coacting with the spherical plug may receive an additional radial compression or bias to prevent a radial deformation by having the flanges conically inclined towards their free end in the direction of flow. The sealing ring will be mounted in such manner that first it is pushed on the flange of the disc having the smaller diameter in the direction against the conical taper, whereafter the sheet metal disc having the flange of greater diameter is pushed over the ring, the conical flange directed inwardly bearing against the external circumference of the sealing ring.

Holding discs made of sheet metal, in which the receiving grooves for the sealing rings are obtained by shaping the sheet metal, offer essential advantages with respect to rigid nondeformable holding discs. These advantages consist in that in spherical plug valves having sheet metal holding discs, a sealing not only can be obtained on the downstream side of the spherical plug, but also on the upstream side. Namely, when the construction of the plug is such that the sealing rings mounted in the holding discs for coacting with the plug are biased against the plug, a sealing effect is also obtained on the downstream side of the plug; this bias can be obtained by supporting the rings from the outer side by corresponding casing portions or by deformation of the sheet metal discs. The required contact pressure between plug and sealing ring at higher operating pressures of the valve results from the fact that the pressure of the medium acting against the plug and supported by the holding disc deforms the disc and thus produces a higher contact pressure between the sealing ring and the spherical plug.

At a given thickness of the holding disc, the pressure obviously may become so high as to produce an important plastic deformation of the holding disc in the region between the edge supported in the casing and the edge supported against the plug so as to produce damage and leakage in the valve. This could be obviated by making the holding discs nondeformable and rigid, however such rigid discs would result in the loss of the manufacturing advantages obtained by making the holding discs of relatively thin sheet metal.

This problem can be solved by providing a holding disc of sheet metal, which on the side of the spherical plug cooperates with a supporting ring mounted in the casing to take up the pressure acting from the other side against the holding disc during operation of the valve, this supporting ring, in the absence of pressure in the valves being mounted with clearance with respect to the holding disc in the region of the holding disc intermediate the mounting grooves for the two sealing rings and in an annular zone joining the inner diameter of the supporting ring, so that the holding disc in this zone only bears against the supporting ring after having been deformed owing to a predetermined pressure in the valve. In this manner, the holding disc of sheet metal can be made relatively thin. With increasing pressure a deformation of the holding disc is possible and accordingly also the required additional contact pressure between the sealing ring and the plug. At the desired predetermined pressure or deformation of the holding disc, this latter abuts against the supporting ring so that upon a further increase in pressure in the region of the supporting ring no further deformation of the holding disc is possible. By suitably chosing the inner diameter of the supporting ring it can be obtained that after abutting of the holding disc against the supporting ring in the zone within this inner diameter of the supporting ring still an additional small deformation will occur.

For the control of the deformation behavior of the holding disc in response to pressure an advantageous construction consists in making the clearance between the supporting ring and holding disc decrease from the inner diameter towards the outside, if desired until mutual contact. Owing to deflection of the holding disc due to pressure acting from the outside, the contact circle of the holding disc on the supporting ring member will progressively displace with increasing pressure towards the axis of the holding disc. It is thus possible, by selecting the decrease of clearance to obtain the desired characteristic of the contact pressure between the sealing ring and the spherical plug. In most cases it will be satisfactory for the clearance to decrease linearly, which will result in manufacturing advantages. To meet particular conditions of stress, however, it may be advantageous to have a progressively decreasing clearance, since in this case the possible deformation of the holding disc decreases rapidly with increasing pressure. In this case it is to be ensured naturally, that the spherical plug does not move too far downstream.

The valve according to the invention will now be more fully described with reference to the accompanying drawings, in which.

Figure 1:
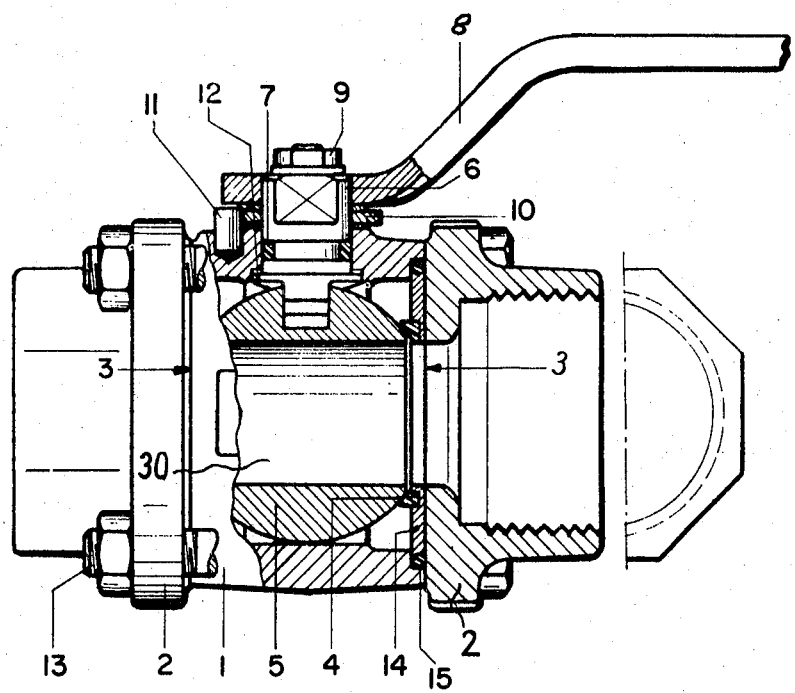
FIG. 1 is a view in elevation, partly in section, of a valve having a spherical plug with a one part holding disc.

Referring to FIG. 1, the represented spherical plug valve comprises a three-part casing 1, 2, the two separating planes 3 extending at right angles to the direction of flow in the region of two sealing rings 4 provided between the casing parts and the spherical plug 5. In the drawing of FIG. 1 only one of the two sealing rings 4 is visible. The spherical plug 5 provided with a flow passage 30 and forming the valve control member is arranged in the middle casing portion 1. The plug 5 can be rotated by means of an actuating bolt 6. The bolt 6 is sealed with respect to the casing by means of a U-ring 7 and its end projecting out of the casing is secured to an actuating handle 8 by means of a screw nut 9. The movement of rotation of the handle 8 and accordingly of the plug 5 is limited by an abutment disc 10 cooperating with a stop pin 11 engaged in the middle casing part 1. The actuating bolt 6 furthermore has a shoulder 12 which retains the bolt relative to the casing against the action of internal pressure in the valve.

Two lateral casing parts 2 join the middle casing part 1 at either side thereof and the three-part casing structure is held together by screw bolts 13, the middle casing part 1 being thus maintained between the two end parts 2. The sealing rings 4 for sealing the spherical plug 5 with respect to the casing parts 1, 2 are each arranged in an axially open annular groove near the inner edge of a holding disc 14 having at its outer edge a circumferential groove for engagement of an O-ring. Since the holding disc 14 is seated in a recess of the middle casing part 1, which recess has an axial depth corresponding to the thickness of the disc 14, and since the O-ring has a diameter which is greater than the thickness of the disc 14, the O-ring, after assembling the three-part casing, forms a tight seal towards the middle casing part as well as towards the adjacent casing end part 2. Since the holding disc 14 has a sufficient thickness, the sealing rings will be satisfactorily maintained therein. The valve, in spite of this structure can be disassembled in simple manner, since the holding discs 14 are mounted in corresponding recesses in the middle casing part 1 and this casing part can be removed from the pipe conduit after taking off the screw bolts 13, without requiring the casing parts 2 to be disconnected from the joining pipe line lengths. After removal of the middle casing part 1 from the pipe conduit, the two holding discs 14 which are exposed on either side, together with the sealing rings 4 and 15 can be removed from the middle casing part. Then also the remaining structural parts can be disassembled and the sealing rings can be exchanged in simple manner. When successively assembling the valve each two sealing rings 4, 15 and one holding disc 14 form a unit which can be inserted into one of two recesses provided in the middle casing portion 1 at the separating planes 3.

Figure 2:
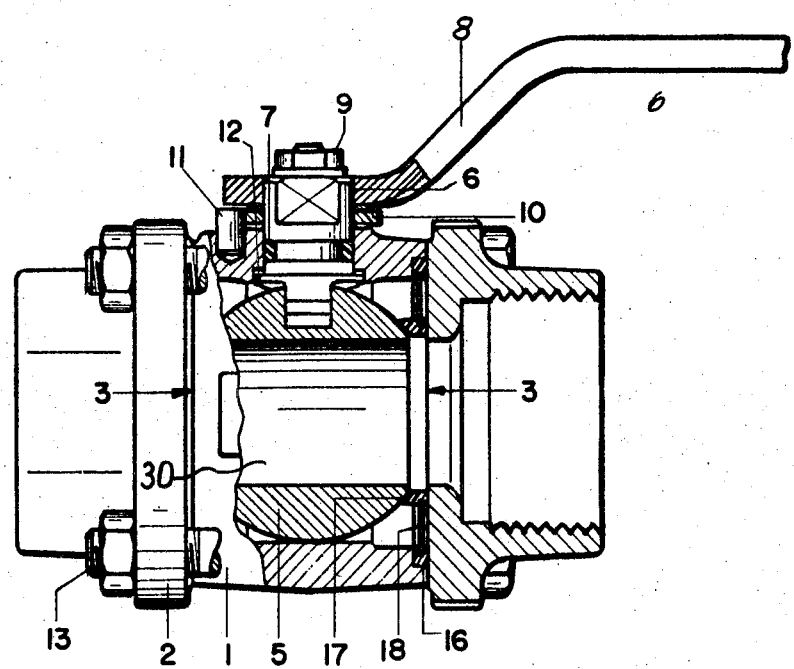
FIGS. 2 and 3 are sectional views of similar valves in which the holding disc consists of shaped sheet metal members.

The valve represented in FIG. 2 corresponds to that of FIG. 1 with regard to its general construction; the same numbers of reference designate the same parts as in FIG. 1. The sealing rings 16, 17 sealing the joint between the two adjacent casing parts 1, 2 and coacting with the plug, respectively, are connected by a substantially plane sheet metal disc 18 engaging into radial grooves provided on the inner and outer circumference, respectively, of the two sealing rings. In order that the connection between the sheet metal disc and the sealing rings is sufficiently strong in this construction, the sealing rings 16, 17 may consist of a harder rubber or plastic material, for example of polytetrafluorethylene. In this case the same advantages result as in the embodiment according to FIG. 1.

Figure 3:
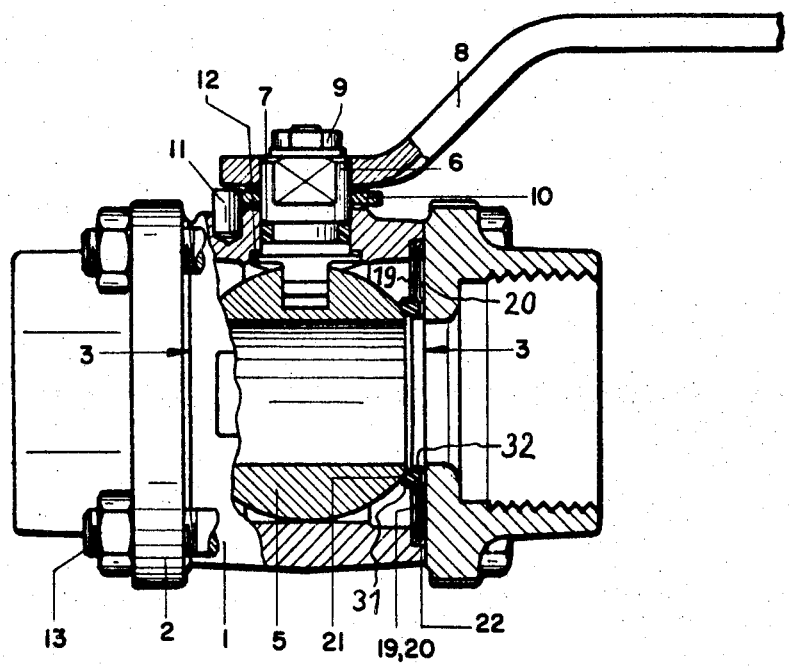

The construction of the valve according to FIG. 3 corresponds to that just above described. The holding disc, however, consists of two sheet metal discs 19, 20. These two discs together forming the holding disc having the same outer diameter and engage together into a radial groove formed along the inner circumference of the sealing ring 22 sealing the joint between the two adjacent casing ports 1, 2. In this manner the two sheet metal discs are held together. The sheet metal discs 19, 20 each have an axially directed flange 31, 32 at their inner edges, the two flanges having different diameters. The sealing ring coating with the plug is inserted into the annular space between the two flanges, the sealing ring being maintained between the two flanges extending almost to the spherical surface of the plug and being firmly held thereby against any deformation. The holding ring formed by the two sheet metal discs 19, 20 forms a unit together with the two sealing rings, this unit offering the advantages as explained above with regard to simple assembly and disassembly.

Moreover, the substantially axially extending sheet metal flanges allow application of a radial bias of any desired value to the sealing ring inserted therebetween, in order to balance the axially directed force acting on the sealing ring when the plug is in closing position. For this purpose the flanges are conically inclined towards their free end with respect to the flow axis. When assembling the sealing ring 21, this latter first is pushed on the conical flange 32 of the sheet metal disc having the smaller inner diameter and afterwards the sheet metal disc having the flange 31 of larger diameter is pushed over the sealing ring, this flange of larger diameter being resiliently expanded by the sealing ring, so that the sealing ring also is resiliently biased from the outside. The conical inclination of the flanges must not exist over their entire axial length, it being sufficient that when a portion of the total length is inclined in such manner that the sealing ring 21 can be pushed on the flange. The radial bias of the sealing ring prevents its radial deformation by axial forces exerted by the spherical plug acting thereon; the useful life of the sealing rings will thereby be substantially increased.

Figure 4:
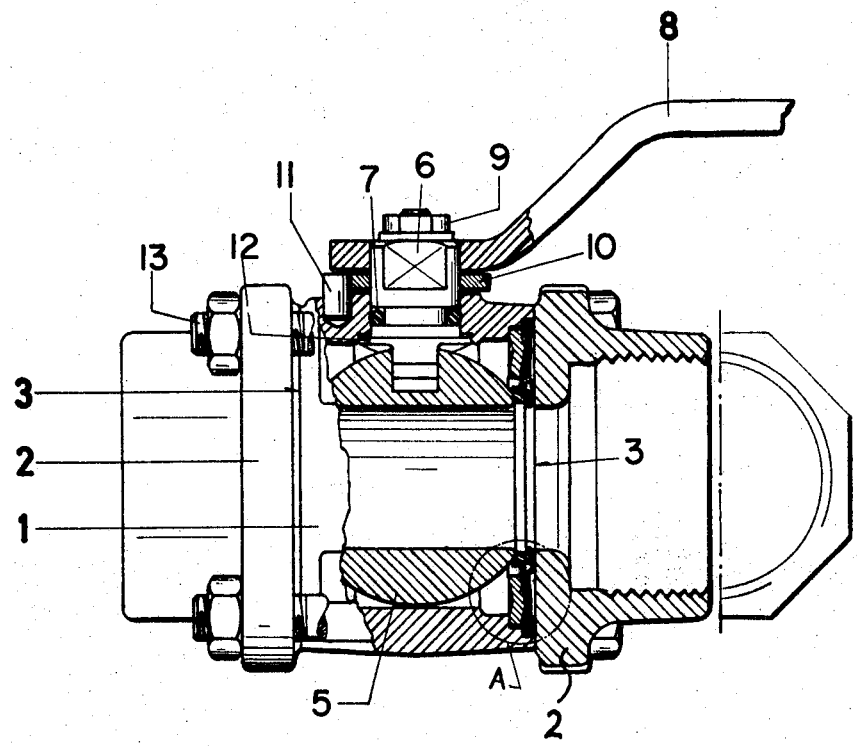
FIG. 4 is a view in elevation, partly in section, of a valve having a spherical plug in which the clearance between the support and the holding disc decreases linearly from the inside towards the outside.
Figure 5:
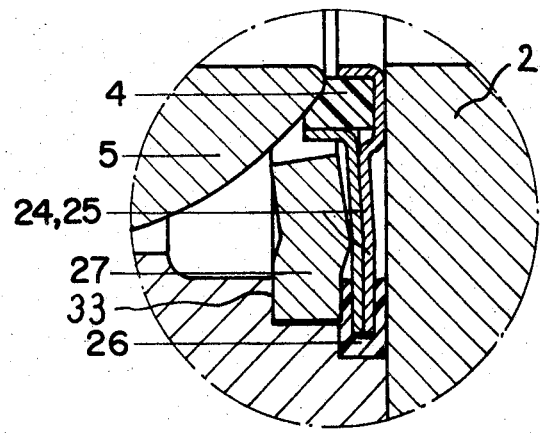
FIG. 5 shows the detail A in FIG. 4 drawn to a larger scale.

The valve represented in FIG. 4 and 5 corresponds, as to its general construction to the valve shown in FIG. 1; the same reference numbers designate like parts as in FIG. 1. The sealing rings 4 for sealing off the ball plug 5 are arranged close to the inner edge of an annular holding disc consisting of two sheet metal discs 24, 25. These two discs forming together the holding disc have the same diameter at their outer edge and engage side-by-side into a radially open groove of a sealing ring 26 for sealing the joint between the two adjacent casing parts. In this manner the two sheet metal discs are maintained together. At this inner edge the two sheet metal discs 24, 25 each comprise an axially directed flange, the two flanges having different diameters. The sealing ring 4 coacting with the plug is inserted between the two flanges and firmly maintained by the flanges which almost extend until the spherical surface of the plug and prevent any deformation of the sealing ring. The holding disc formed by the two sheet metal discs 24, 25 forms a unit together with the two sealing rings, this unit offering the mentioned advantages with respect to simple assembling and disassembling.

A supporting ring 27 is provided laterally of the holding disc 24, 25 on the side towards the ball plug and abuts against a shoulder 33 of the casing. The supporting ring 27 also abuts against the holding disc 24, 25 at a point close to the sealing ring 26 and intermediate the two sealing rings 4 and 26. The clearance between the supporting ring and the holding disc then increases linearly towards the internal diameter of the holding disc. The construction accordingly is such that in the pressureless condition of the valve, the sealing ring 4 is pressed against the spherical surface; the pressure results in this case from the fact that the holding disc, in the region of the sealing ring is supported against the adjacent casing part 2 and a bias is produced when the screw bolts 13 are tightened.

It would also be possible to produce the bias of the sealing ring 4 against the spherical plug surface only by a deformation of the sheet metal holding disc 24, 25.

When the valve is closed and a pressure is building up from the casing part 2, the holding disc 24, 25 will be deformed in the region between the two sealing rings 4 and 26 and will increase the pressure acting on the sphere. A tight seal with respect to the prevailing pressure thus is ensured. The deflection of the holding disc, however, is limited by the supporting ring 27 so that no inadmissible deformation will result in the region between the two sealing rings 4 and 26. As soon as the face of the holding disc is completely applied against the supporting ring 27, a further deformation of the disc is safely prevented by the supporting ring. The degree of deformation of the holding disc as permitted by the supporting ring is such that a sealing effect is ensured for the entire operating range of the valve.

Figure 6:
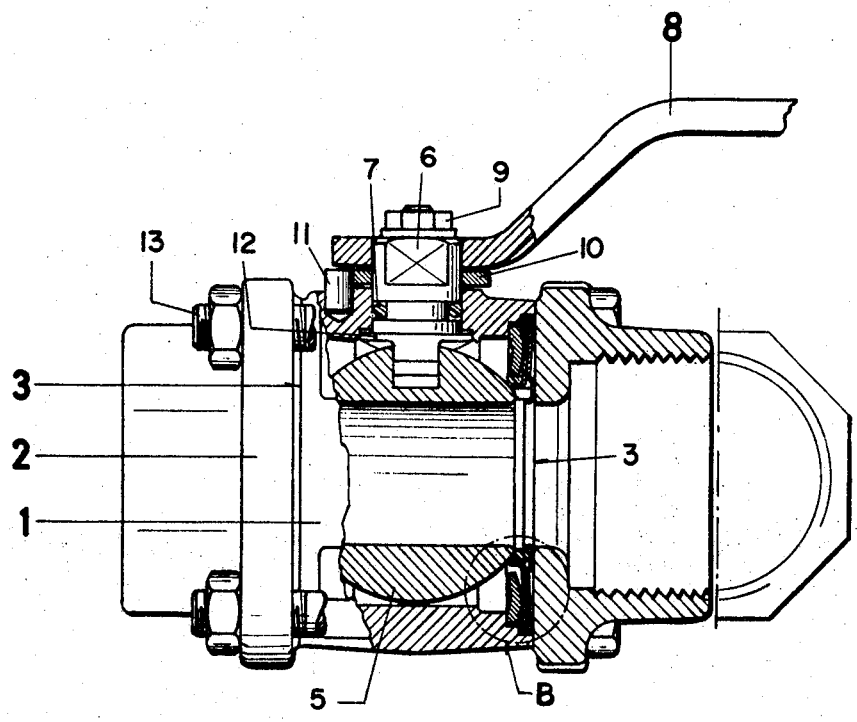
FIG. 6 is a view in elevation, partly in section, of a spherical plug valve in which the clearance between the support and the holding disc progressively decreases from the inside towards the outside.
Figure 7:
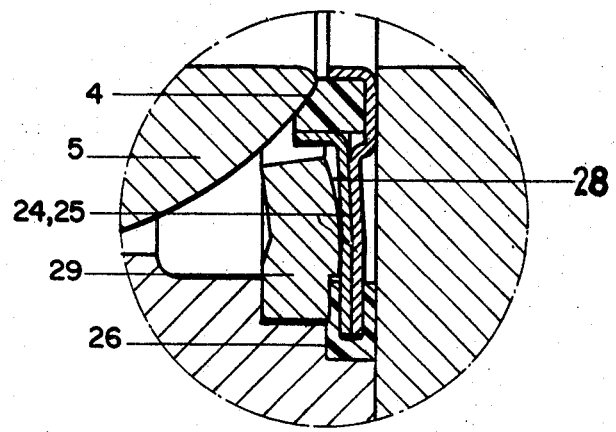
FIG. 7 shows the detail B in FIG. 6 drawn to a larger scale.

The spherical plug valve illustrated in FIGS. 6 and 7 is similar to that shown in FIGS. 4 and 5, only the supporting ring 29 being modified. The same parts are designated by the same reference numerals. In this construction the contact surface 28 of the supporting ring 29 with the holding disc 24, 25 is so formed that in pressureless condition this surface 28 will make contact over a portion of its outer area with the holding disc, and towards the inner edge of the ring 29 the clearance progressively increases between the ring 29 and the holding disc 24, 25. In section the surface 28 making contact with the holding disc close to the sealing ring 26 is a circle. When the holding disc is deformed under a pressure building up in the joining end part of the casing, the holding disc will progressively make contact over the entire surface 28 with the supporting ring 27 until it cannot be deformed any longer. There will result a continuous dependence between the increase of the pressure to be sealed off and the contact pressure of the sealing ring against the spherical plug.

I claim:

1. In a valve having a spherical plug which is rotatably mounted between two sealing rings surrounding the inlet and outlet openings in a valve casing, the valve casing being split in at least one plane extending at right angles to the direction of flow through the valve in the region of a sealing ring, an improvement comprising a holding disc mounted at the plane of separation in the part of the casing containing the spherical plug, said disc having inner and outer edges, a sealing ring at said inner edge in sealing contact with the spherical member and a sealing ring at said outer edge in sealing contact with adjacent casing portions, said holding disc comprising two sheet metal disc elements of identical outer diameter, said sealing ring at the outer edge of the holding disc embracing said disc elements to hold the same together in common while sealing against the adjacent casing portions, said disc elements including axial flanges at the inner edges thereof which are of different diameter, said ring at the inner edge of the holding disc being engaged between the axial flanges in sealing contact with the spherical member.

2. A valve according to claim 1 wherein said flanges are conically inclined towards their free end with respect to the axis of the casing 3. A valve according to claim 1 comprising a supporting ring mounted in the casing adjacent the holding disc at the side of the spherical member to define a free annular space with the outer of said axial flanges, said supporting ring defining a radial clearance between the holding disc and supporting ring which decreases linearly from the inner edge outwardly until the disc and ring make mutual contact.

4. A valve according to claim 1 comprising a supporting ring mounted in the casing adjacent the holding disc at the side of the spherical member and providing a clearance between the holding disc and the supporting ring which decreases progressively from the inner edge of the ring outwardly until the disc and ring make mutual contact.